(12) United States Patent
Gibbs et al.

(10) Patent No.: US 11,840,283 B2
(45) Date of Patent: Dec. 12, 2023

(54) REINFORCEMENT PANEL FOR A VEHICLE TAILGATE

(71) Applicants: Robert J Gibbs, Novi, MI (US); Piyush Agarwal, Rochester Hills, MI (US); Christopher Duke, White Lake, MI (US); Eric Ghoukasian Khouygani, Auburn Hills, MI (US)

(72) Inventors: Robert J Gibbs, Novi, MI (US); Piyush Agarwal, Rochester Hills, MI (US); Christopher Duke, White Lake, MI (US); Eric Ghoukasian Khouygani, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 31 days.

(21) Appl. No.: 17/688,036

(22) Filed: Mar. 7, 2022

(65) Prior Publication Data
US 2023/0278647 A1     Sep. 7, 2023

(51) Int. Cl.
*B62D 33/027* (2006.01)

(52) U.S. Cl.
CPC ............... *B62D 33/0273* (2013.01)

(58) Field of Classification Search
CPC ............ B62D 33/023; B62D 33/027; B62D 33/0273; B62D 33/037; B60R 13/01
See application file for complete search history.

(56) References Cited

U.S. PATENT DOCUMENTS

| 5,169,201 | A | * | 12/1992 | Gower ............... B62D 33/0273 296/57.1 |
| 5,372,397 | A | * | 12/1994 | Arndt ................... B62D 29/001 296/57.1 |
| 5,695,235 | A | * | 12/1997 | Martindale ............. B60R 13/01 296/39.2 |
| 5,786,394 | A | | 7/1998 | Slaven |
| 5,806,909 | A | * | 9/1998 | Wise ....................... B60R 13/01 296/97.23 |
| 6,672,642 | B1 | | 1/2004 | Seksaria et al. |
| 6,988,757 | B2 | | 1/2006 | McLaren et al. |
| 9,701,225 | B1 | * | 7/2017 | Hogan ..................... A47C 4/52 |
| 9,862,430 | B1 | * | 1/2018 | Stojkovic ........... B62D 33/0273 |
| 10,526,023 | B2 | | 1/2020 | Marchlewski et al. |
| 11,511,816 | B1 | * | 11/2022 | Vanduzer ............ B62D 33/037 |

(Continued)

FOREIGN PATENT DOCUMENTS

| CN | 205915991 U | 2/2017 |
| CN | 207000377 U | 2/2018 |
| WO | WO-2016120080 A1 | 8/2016 |

*Primary Examiner* — Gregory A Blankenship
(74) *Attorney, Agent, or Firm* — Jeremy J. Klobucar (57) ABSTRACT

A multifunction tailgate including a first door and a second door that are each selectably pivotable relative to the vehicle between an open position and a closed position along both a horizontal axis and a second vertical axis. At least one of the first door and the second door includes an exterior structure including an exterior panel, an inner panel, and a pair of side panels that collectively define a cavity, a trim panel coupled to the inner panel, and a reinforcement panel is positioned between the inner panel and the trim panel. The reinforcement panel is formed of a polymeric material, and is configured to provide structural support to the trim panel to assist in absorbing static and dynamic loads received by the trim panel.

16 Claims, 5 Drawing Sheets

(56) References Cited

U.S. PATENT DOCUMENTS

| | | | | |
|---|---|---|---|---|
| 2003/0110705 | A1* | 6/2003 | Hlavach | B60J 5/103 |
| | | | | 49/501 |
| 2012/0324793 | A1* | 12/2012 | Abbasi | B62D 33/0273 |
| | | | | 49/168 |
| 2018/0086392 | A1* | 3/2018 | Seki | B62D 33/0273 |
| 2020/0198544 | A1* | 6/2020 | Pulleyblank | B60R 9/065 |
| 2020/0198545 | A1* | 6/2020 | Townson | B60R 7/02 |
| 2020/0247483 | A1* | 8/2020 | Ukra | B62D 33/0273 |
| 2021/0101645 | A1* | 4/2021 | Rhodes | E05D 15/52 |
| 2021/0214023 | A1* | 7/2021 | Birka | B62D 29/043 |
| 2022/0126929 | A1* | 4/2022 | Phillips | B60N 3/001 |
| 2022/0289312 | A1* | 9/2022 | Aquila | B60R 5/02 |
| 2022/0388578 | A1* | 12/2022 | Gill | B62D 33/0273 |
| 2023/0040098 | A1* | 2/2023 | Hoogendoorn | B60P 7/0815 |
| 2023/0046429 | A1* | 2/2023 | Go | B60J 5/125 |

* cited by examiner

REINFORCEMENT PANEL FOR A VEHICLE TAILGATE

FIELD

The present disclosure relates a reinforcement panel for a vehicle tailgate.

BACKGROUND

It is common for vehicles to include an area such as a cargo bed, where it is desirable for the cargo bed to be closed in some situations, but open at other times in order to provide access to the cargo bed. A closure, such as a door or tailgate, affixed to the vehicle has often been used to both block the cargo bed at some times, and to provide access to it at others. In some instances, it has been found to be advantageous to provide a multi-functional tailgate which includes two doors, each capable of being pivoted about a horizontal axis and a vertical axis. Multifunctional tailgate systems, however, are frequently heavier than traditional tailgate systems, which is undesirable. Thus, there is a need to reduce the weight of the multifunctional tailgate system.

SUMMARY

According to a first aspect, the present disclosure provides a multifunction tailgate for a vehicle including a bed, comprising a first door that is selectably pivotable relative to the vehicle between an open position and a closed position along both a horizontal axis and a first vertical axis, the first door being independently pivotable along the first vertical axis; and a second door that is selectably pivotable relative to the vehicle between an open position and a closed position along both the horizontal axis and a second vertical axis, the second door being independently pivotable along the second vertical axis. At least one of the first door and the second door includes an exterior structure including an exterior panel, an inner panel, and a pair of side panels that collectively define a cavity, a trim panel coupled to the inner panel, and a reinforcement panel is positioned between the inner panel and the trim panel. The reinforcement panel is formed of a polymeric material, and is configured to provide structural support to the trim panel to assist in absorbing static and dynamic loads received by the trim panel.

According to the first aspect, the reinforcement panel includes a first major surface and an opposing second major surface that are connected to each other by a side surface, and at least one expanded thickness section extending outward from one of the first major surface and the second major surface.

According to the first aspect, the inner panel of the exterior structure includes at least one opening that is configured for receipt of the at least one expanded thickness section.

According to the first aspect, the reinforcement panel includes a plurality of expanded thickness sections that each extend outward from one of the first major surface and the second major surface.

According to the first aspect, a thickness of each of the expanded thickness sections is the same.

According to the first aspect, a thickness of each of the expanded thickness sections is different.

According to the first aspect, a density of the polymeric material in each of the expanded thickness sections is the same.

According to the first aspect, a density of the polymeric material in each of the expanded thickness sections is different.

According to the first aspect, the reinforcement panel includes a plurality of apertures that are configured for receipt of a fastener that attaches the reinforcement panel to the inner panel of the exterior structure.

According to the first aspect, the polymeric material is expanded polypropylene.

According to a second aspect of the present disclosure, there is provided multifunction tailgate for a vehicle including a bed, comprising a first door that is selectably pivotable relative to the vehicle between an open position and a closed position along both a horizontal axis and a first vertical axis, the first door being independently pivotable along the first vertical axis; and a second door that is selectably pivotable relative to the vehicle between an open position and a closed position along both the horizontal axis and a second vertical axis, the second door being independently pivotable along the second vertical axis. At least one of the first door and the second door includes an exterior structure including a rigid exterior panel, a rigid inner panel, and a pair of rigid side panels that collectively define a cavity, a polymeric trim panel coupled to the rigid inner panel, and a polymeric reinforcement panel positioned between the rigid inner panel and the polymeric trim panel The polymeric reinforcement panel includes a first major surface and an opposing second major surface that are connected to each other by a side surface, and a plurality of expanded thickness sections that are unitary with and each extend outward from one of the first major surface and the second major surface, the rigid inner panel of the exterior structure includes a plurality of openings that are configured for receipt of the expanded thickness sections, and the polymeric reinforcement panel is configured to provide structural support to the trim panel to assist in absorbing static and dynamic loads received by the polymeric trim panel.

According to the second aspect, a thickness of each of the expanded thickness sections is the same.

According to the second aspect, a thickness of each of the expanded thickness sections is different.

According to the second aspect, a density of a polymeric material that forms the polymeric reinforcement panel in each of the expanded thickness sections is the same.

According to the second aspect, a density of a polymeric material that forms the polymeric reinforcement panel in each of the expanded thickness sections is different.

According to the second aspect, the polymeric reinforcement panel includes a plurality of apertures that are configured for receipt of a fastener that attaches the polymeric reinforcement panel to the rigid inner panel of the exterior structure.

According to the second aspect, the polymeric reinforcement panel is formed of expanded polypropylene.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do

DETAILED DESCRIPTION

Figure 1:
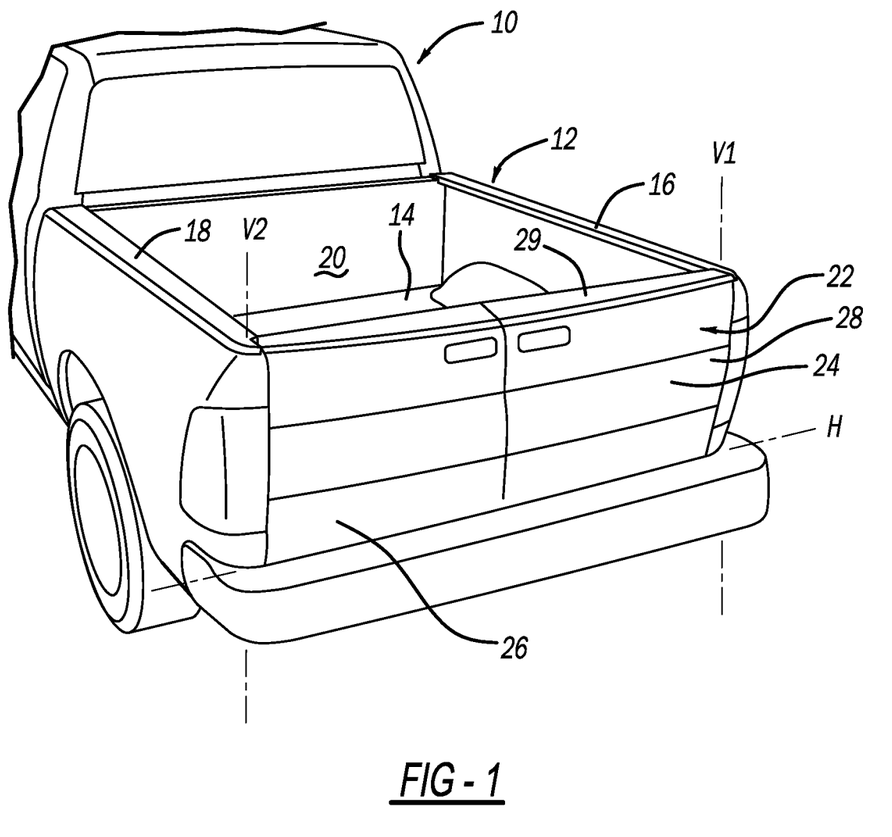
FIG. 1 is a partial perspective view of a vehicle including a multifunctional tailgate.

With reference to FIG. 1, a vehicle 10 is illustrated. Vehicle 10 may be a pickup truck including cargo bed 12, which includes a floor deck 14, a pair of sidewalls 16 and 18, and a front wall panel 20. Cargo bed 12 also includes a rear or aft opening that is configured for receipt of a multi-function tailgate 22. In the illustrated embodiment tailgate 22 includes a pair of doors 24 and 26. Tailgate 22 is pivotally coupled to the cargo bed 12 so that tailgate 22 is allowed to pivot about a horizontal axis H between a horizontal open position and a horizontal closed position. Doors 24 and 26 may be latched together so as to pivot together about horizontal axis H, or doors 24 and 26 may be unlatched so as to pivot independently of each other about horizontal axis H. When doors 24 and 26 are unlatched, each door 24, 26 can also rotate independently about a respective vertical axis V1, V2 between a vertical open position and a vertical closed position. While doors 24 and 26 are illustrated as being similarly sized, it should be understood that door 24 may be smaller or larger than door 26 without departing from the scope of the present disclosure.

Figure 2:
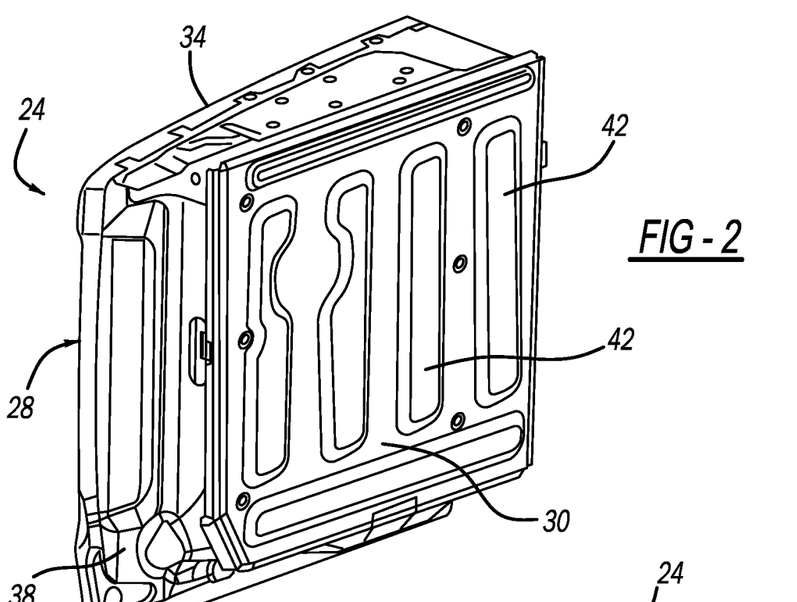
FIG. 2 is a perspective view of a door of the multifunction tailgate illustrated in FIG. 1.
Figure 3:
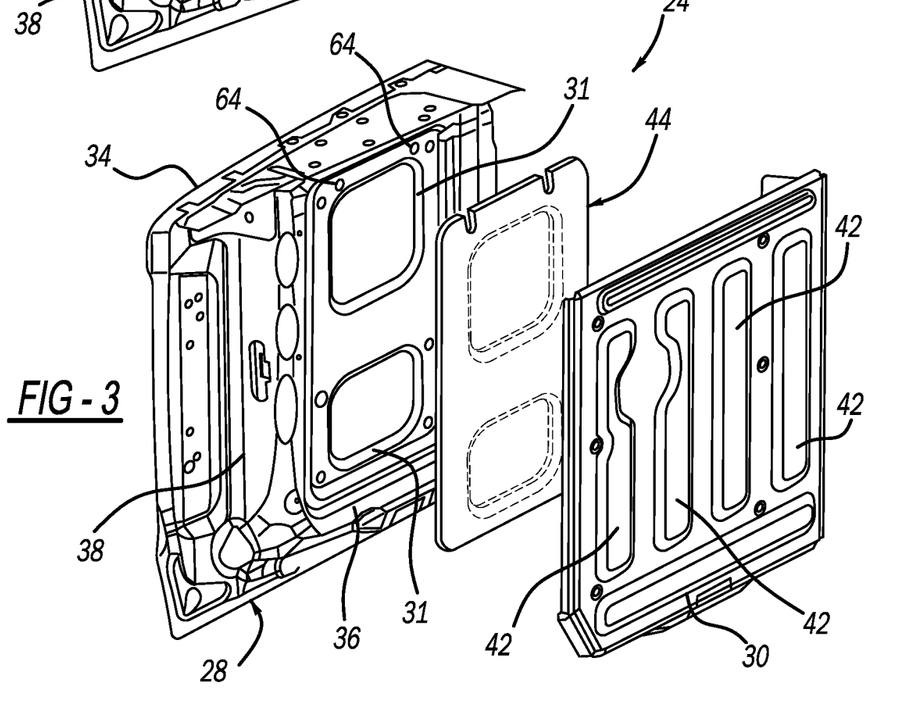
FIG. 3 is an exploded perspective view of the door illustrated in FIG. 2.
Figure 4:
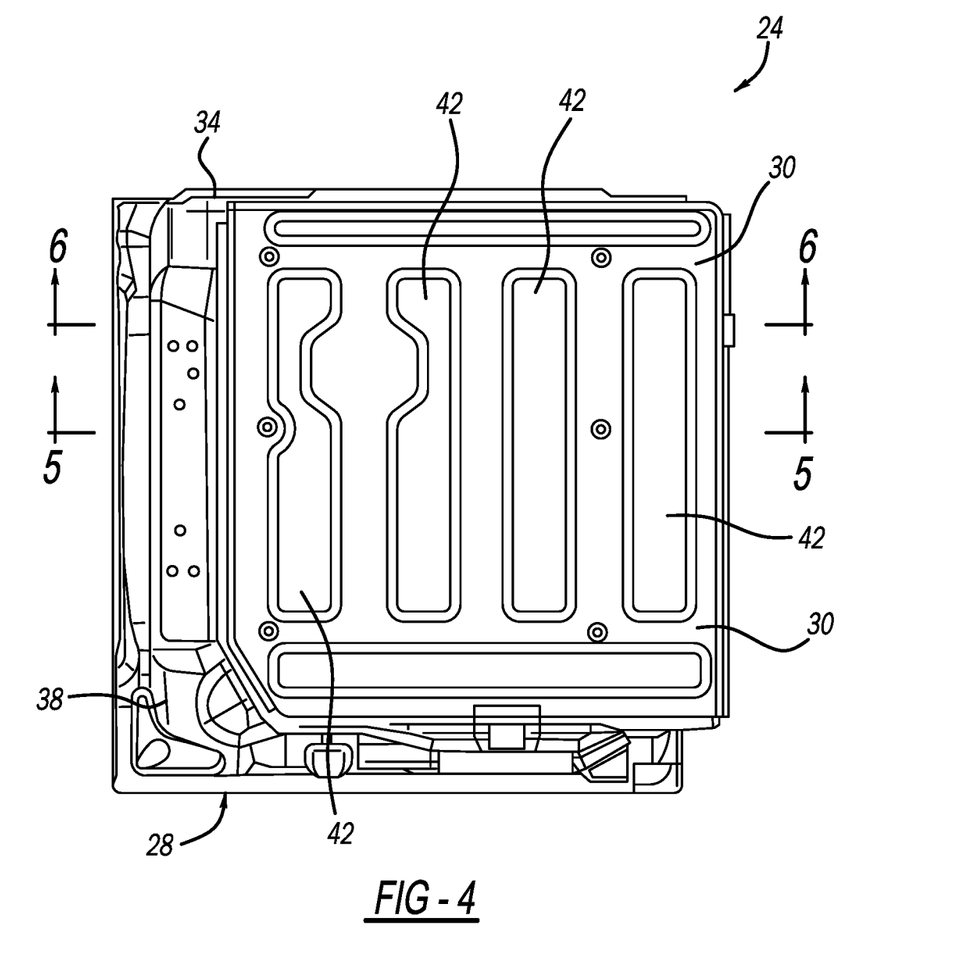
FIG. 4 is a rear-perspective view of the door illustrated in FIG. 2.

FIG. 2 is a perspective view of door 24 in an assembled state, and FIG. 3 is an exploded view of door 24. Although not illustrated, it should be understood that door 26 has the same construction as door 24. Door 24 includes an outer or exterior structure 28, a trim panel 30 that faces bed 12, and an interior cavity 32 between exterior structure 28 and trim panel 30 (FIG. 4).

Figure 5:
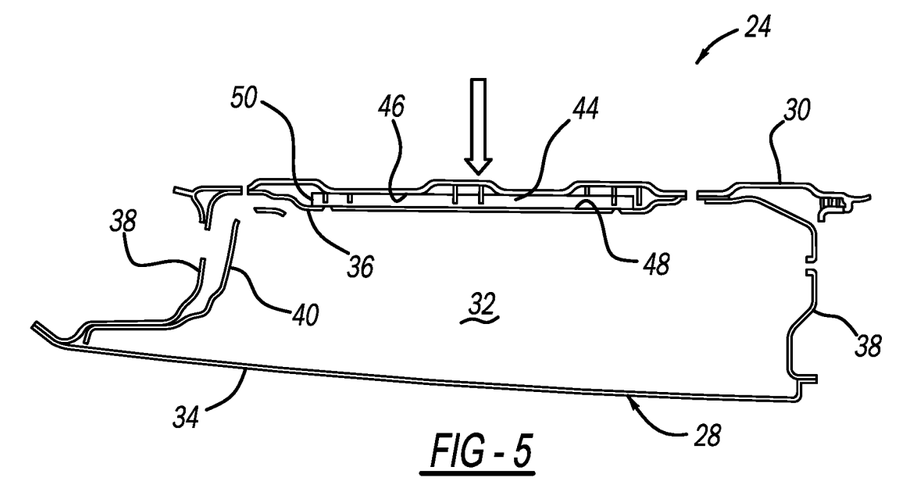
FIGS. 5 and 6 are cross-sectional views of the door illustrated in FIG. 4.
Figure 6:
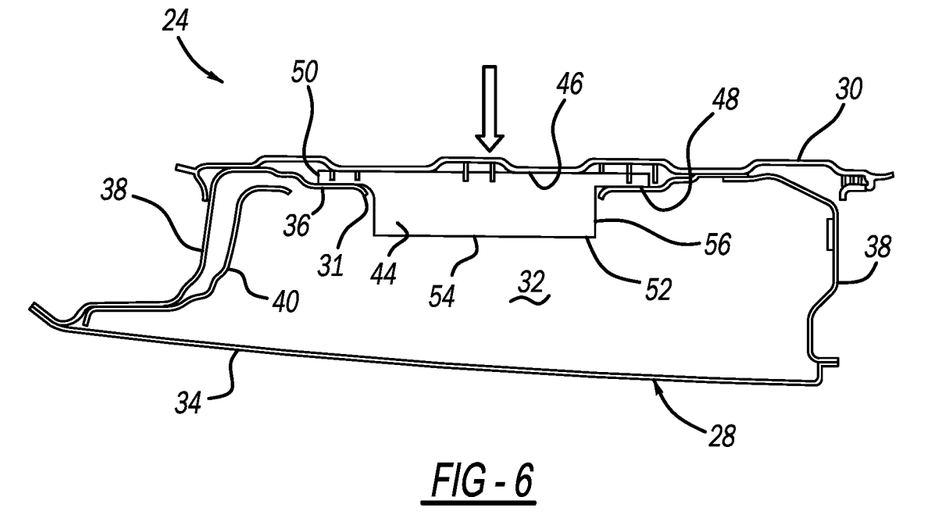

As best shown in FIG. 5, exterior structure 28 includes an outer or exterior panel 34, an inner panel 36, and a pair of side panels 38 that collectively define interior cavity 32, and which are each generally formed of a rigid metal material such as steel. Although not required, exterior structure 28 may additionally include a support panel 40 within interior cavity 32 attached to one or both of the side panels 38 that increases the rigidity of the side panel 38. Doors 24, 26 may also include cap 29 as best shown in FIG. 1.

Now referring to FIGS. 3 to 6, trim panel 30 may be generally formed of a polymeric material. Trim panel 30 is designed to cover gaps or openings 31 at inner panel 36 of the exterior structure 28, and additionally improves the appearance and functionality of doors 24, 26. For example, trim panel 30 may include a plurality of elongate protrusions 42. Protrusions 42 may increase the aesthetic appeal of trim panel 30, but also increase the functionality of trim panel 30 and cargo bed 12. In this regard, protrusions 42 may be spaced apart to an extent that a beam (e.g., a two-by-four wood beam or some other type of member) may be positioned between adjacent protrusions 42 that may be used to divide cargo bed 12.

In addition, protrusions 42 may be used to absorb static and dynamic loads that may be applied to trim panel 30 that prevent the load being applied to and damaging inner panel 36. This is necessary because interior cavity 32 may be used to house various locking mechanisms and electronic features (i.e., electronics or wires associated with a rear-view camera (not shown)) that require protection. It should be understood, however, that protrusions 42 may not be satisfactory to absorb the static and dynamic loads to an extent that ensures that the features located within interior cavity 32 are fully protected. Moreover, while the trim panel 30 may be designed with a high stiffness or rigidity to absorb or withstand the static and dynamic loads that may be applied thereto, achieving such high stiffness or rigidity limits the choice of materials that can be used to form trim panel 30, and also limits the manufacturing processes that can be used to form trim panel 30. These drawbacks limit the design flexibility and ability to improve the overall appearance of trim panel 30.

Another way to improve the ability of the trim panel 30 to withstand static and dynamic loads includes using a reinforcement panel 44 between the trim panel 30 and the inner panel 36 of the exterior structure 28. Typically, such a reinforcement panel 44 is a panel formed of sheet metal. The drawbacks of using a metal reinforcement panel, however, include an increase in weight of the doors 24, 26 of tailgate 22, a relatively high part and tool cost, and a complex tooling and manufacturing process, which places limits on design flexibility and the ability to improve appearance of the trim panel 30. In addition, a sheet metal reinforcement panel typically requires an electrodeposition coating (i.e., E-coat) to prevent corrosion of the sheet metal.

Figure 7:
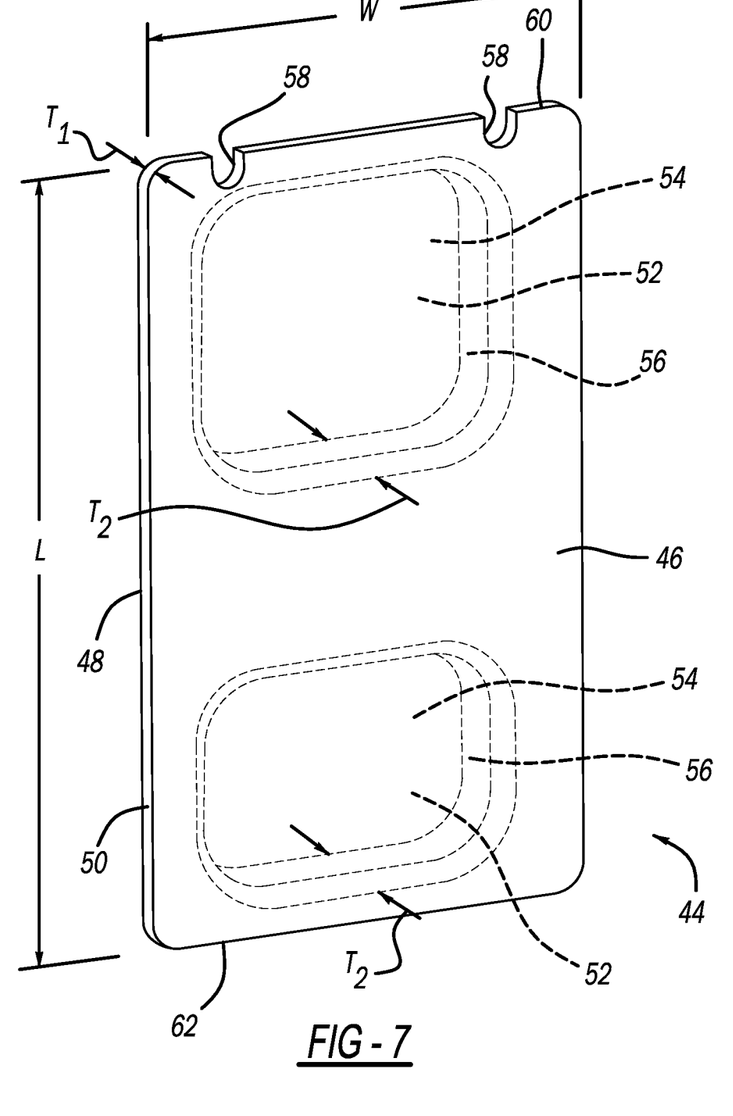
FIG. 7 is a perspective view of a reinforcement panel according to a principle of the present disclosure.

With the above in mind, the present disclosure provides a reinforcement panel 44 is located between inner panel 36 of exterior structure 28 and trim panel 30 that is designed to reinforce trim panel 30. As best shown in FIG. 7, reinforcement panel 44 includes a first major surface 46 and an opposite second major surface 48. A side surface 50 connects first major surface 46 to second major surface 48. Reinforcement panel 44 includes a length L, a width W, and a thickness T1.

Reinforcement panel 44 additionally includes a pair of expanded thickness sections 52 that have a thickness T2 that extend outward from one of the first major surface 46 and the second major surface 48. Expanded thickness sections 52 are each shaped to correspond to a shape of openings 31 formed in inner panel 36. Although panel 44 is illustrated as having a pair of expanded thickness sections 52, it will be appreciated that panel 44 can include only a single section 52 or a greater number of sections 52 without departing from the scope of the present disclosure. In addition, the thickness T2 of each section 52 may be the same, or may be different. Each expanded thickness section 52 includes a planar surface 54 that is parallel with each of first major surface 46 and second major surface 48. A second side surface 56 connects planar surface 54 to either first major surface 46 or second major surface 48. Second side surface is parallel with first side surface 50.

Panel 44 may include a plurality of apertures 58 formed at first side surface 50 that are configured for receipt of a fastener (not shown) that can attach panel 44 to inner panel 36 of exterior structure 28. In the illustrated embodiment, apertures 58 are formed along width W of first side surface 50 at an upper end 60 (i.e., an end of panel 44 that is adjacent cap 29) of panel 44. It should be understood, however, that apertures 58 may also be formed along a lower end 62 of panel 44, or along lengths L1 of panel 44. Apertures 58 align with threaded recesses 64 formed in inner panel 32.

Reinforcement panel 44 is configured to provide increased support to trim panel 30 to offset loads that may be applied to inner panel 36 and trim panel 30 during use of bed 12 of vehicle 10. In this regard, inner panel 36 and trim panel 30 may experience compressive loads at locations where panel 44 is sandwiched between trim panel 30 and inner panel 36, and bending loads where reinforcement panel 44 is not sandwiched between trim panel 30 and inner panel 36 (i.e., where expanded thickness sections 52 are engaged with openings 31). Due to use of expanded thickness sections 52, the bending loads applied to trim panel 30 and inner panel 36 are mitigated.

In contrast to a metal material that increases the weight of the doors 24, 26 of tailgate 22, has a relatively high part and tool cost, and has a complex tooling and manufacturing process, reinforcement panel 44 may be entirely formed of a polymeric material such as expanded polypropylene. Alternatively, reinforcement panel 44 may have a honeycomb base structure that is coated with a polymeric material such as polyurethane. In either case, reinforcement panel 44 is a light weight panel that reduces the weight of doors 24, 26 of tailgate 22. The use of these materials permits flexibility in designing reinforcement panel 44, reduces the cost of the reinforcement panel 44, and does not require a complex manufacturing process. In this regard, a polymeric reinforcement panel is not susceptible to corrosion and, therefore, is not required to be coated with an electrodeposition coating like a panel that may be formed of a metal material. In addition, due to the reinforcement panel 44 being formed of a polymeric material, the reinforcement panel 44 can be designed to have the expanded thickness sections 52 that mitigate the bending loads that may be applied to trim panel 30 and inner panel 36.

It should also be understood that the use of polymeric materials to form reinforcement panel 44 enable various portions of the reinforcement panel to have different densities. For example, expanded thickness sections 52 may have a density that is greater than the portions of reinforcement panel 44 having the thickness T1. Alternatively, the portions of reinforcement panel 44 having the thickness T1 may have a greater density than the expanded thickness sections 52 due to these portions having a lesser thickness. In general, the thickness T1 is in a range of about 3 mm to about 5 mm, and the thickness T2 is in the range of about 6 mm to about 10 mm. It should be understood, however, that these ranges are variable, and may be tailored to the desired amount of reinforcement that is provided by reinforcement panel 44.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multifunction tailgate for a vehicle including a bed, comprising:
a first door that is selectably pivotable relative to the vehicle between an open position and a closed position along both a horizontal axis and a first vertical axis, the first door being independently pivotable along the first vertical axis; and
a second door that is selectably pivotable relative to the vehicle between an open position and a closed position along both the horizontal axis and a second vertical axis, the second door being independently pivotable along the second vertical axis,
wherein at least one of the first door and the second door includes an exterior structure including an exterior panel, an inner panel, and a pair of side panels that collectively define a cavity, a trim panel coupled to the inner panel, and a reinforcement panel positioned between the inner panel and the trim panel,
wherein the reinforcement panel is formed of a polymeric material, and is configured to provide structural support to the trim panel to assist in absorbing static and dynamic loads received by the trim panel, and
wherein the reinforcement panel includes a first major surface and an opposing second major surface that are connected to each other by a side surface, and at least one expanded thickness section extending outward from one of the first major surface and the second major surface.

2. The multifunction tailgate according to claim 1, wherein the inner panel of the exterior structure includes at least one opening that is configured for receipt of the at least one expanded thickness section.

3. The multifunction tailgate according to claim 1, wherein the reinforcement panel includes a plurality of expanded thickness sections that each extend outward from one of the first major surface and the second major surface.

4. The multifunction tailgate according to claim 3, wherein a thickness of each of the expanded thickness sections is the same.

5. The multifunction tailgate according to claim 3, wherein a thickness of each of the expanded thickness sections is different.

6. The multifunction tailgate according to claim 3, wherein a density of the polymeric material in each of the expanded thickness sections is the same.

7. The multifunction tailgate according to claim 3, wherein a density of the polymeric material in each of the expanded thickness sections is different.

8. The multifunction tailgate according to claim 1, wherein the reinforcement panel includes a plurality of apertures that are configured for receipt of a fastener that attaches the reinforcement panel to the inner panel of the exterior structure.

9. The multifunction tailgate according to claim 1, wherein the polymeric material is expanded polypropylene.

10. A multifunction tailgate for a vehicle including a bed, comprising:
a first door that is selectably pivotable relative to the vehicle between an open position and a closed position along both a horizontal axis and a first vertical axis, the first door being independently pivotable along the first vertical axis; and
a second door that is selectably pivotable relative to the vehicle between an open position and a closed position along both the horizontal axis and a second vertical axis, the second door being independently pivotable along the second vertical axis,
wherein at least one of the first door and the second door includes an exterior structure including a rigid exterior panel, a rigid inner panel, and a pair of rigid side panels that collectively define a cavity, a polymeric trim panel coupled to the rigid inner panel, and a polymeric reinforcement panel positioned between the rigid inner panel and the polymeric trim panel, the polymeric reinforcement panel includes a first major surface and an opposing second major surface that are connected to each other by a side surface, and a plurality of expanded thickness sections that are unitary with and each extend outward from one of the first major surface and the second major surface, the rigid inner panel of the exterior structure includes a plurality of openings that are configured for receipt of the expanded thickness sections, and the polymeric reinforcement panel is configured to provide structural support to the trim panel to assist in absorbing static and dynamic loads received by the polymeric trim panel.

11. The multifunction tailgate according to claim 10, wherein a thickness of each of the expanded thickness sections is the same.

12. The multifunction tailgate according to claim 10, wherein a thickness of each of the expanded thickness sections is different.

13. The multifunction tailgate according to claim 10, wherein a density of a polymeric material that forms the polymeric reinforcement panel in each of the expanded thickness sections is the same.

14. The multifunction tailgate according to claim 10, wherein a density of a polymeric material that forms the polymeric reinforcement panel in each of the expanded thickness sections is different.

15. The multifunction tailgate according to claim 10, wherein the polymeric reinforcement panel includes a plurality of apertures that are configured for receipt of a fastener that attaches the polymeric reinforcement panel to the rigid inner panel of the exterior structure.

16. The multifunction tailgate according to claim 10, wherein the polymeric reinforcement panel is formed of expanded polypropylene.

* * * * *